(12) United States Patent
Konishi

(10) Patent No.: US 12,359,912 B2
(45) Date of Patent: Jul. 15, 2025

(54) CALIBRATION METHOD FOR COMPUTER VISION SYSTEM AND THREE-DIMENSIONAL REFERENCE OBJECT FOR USE IN SAME

(71) Applicant: OMRON Corporation, Kyoto (JP)

(72) Inventor: Yoshinori Konishi, Kyoto (JP)

(73) Assignee: OMRON CORPORATION, Kyoto (JP)

(*) Notice: Subject to any disclaimer, the term of this patent is extended or adjusted under 35 U.S.C. 154(b) by 428 days.

(21) Appl. No.: 17/621,405

(22) PCT Filed: Jul. 26, 2019

(86) PCT No.: PCT/JP2019/029529
§ 371 (c)(1),
(2) Date: Dec. 21, 2021

(87) PCT Pub. No.: WO2021/019627
PCT Pub. Date: Feb. 4, 2021

(65) Prior Publication Data
US 2022/0357153 A1    Nov. 10, 2022

(51) Int. Cl.
G01B 21/04     (2006.01)
B25J 9/16      (2006.01)
G01B 11/24     (2006.01)

(52) U.S. Cl.
CPC .......... *G01B 21/042* (2013.01); *B25J 9/1692* (2013.01); *B25J 9/1697* (2013.01); *G01B 11/24* (2013.01); *G05B 2219/39008* (2013.01)

(58) Field of Classification Search
CPC ...... G01B 21/042; G01B 11/24; B25J 9/1692; B25J 9/1697
See application file for complete search history.

(56) References Cited

U.S. PATENT DOCUMENTS 5,596,683 A * 1/1997 Kasagami ............. B25J 9/1682
901/3
9,613,465 B1    4/2017 Tsai et al.
(Continued)

FOREIGN PATENT DOCUMENTS

CN    105026885 A    11/2015
CN    106886990 A     6/2017
(Continued)

OTHER PUBLICATIONS

Office Action issued in Chinese Appln. No. 201980097798.7 mailed on Jul. 6, 2023. English translation provided.
(Continued)

*Primary Examiner* — Eman A Alkafawi
*Assistant Examiner* — Joseph O Nyamogo
(74) *Attorney, Agent, or Firm* — ROSSI, KIMMS & McDOWELL LLP

(57) ABSTRACT

A calibration method for performing calibration in a computer vision system using a three-dimensional reference object asymmetric as viewed in any direction and having predetermined dimensions includes calculating, based on three-dimensional shape data about the three-dimensional reference object and three-dimensional measurement data obtained through three-dimensional measurement of the three-dimensional reference object, a position and an orientation of the three-dimensional reference object relative to a measurement unit coordinate system defined for the three-dimensional measurement unit, and calculating a reference-measurement unit transformation matrix representing a coordinate transformation between the measurement unit coordinate system and a reference coordinate system defined for the three-dimensional reference object.

6 Claims, 9 Drawing Sheets

(56) References Cited

U.S. PATENT DOCUMENTS

| | | | |
|---|---|---|---|
| 2002/0171847 A1 | 11/2002 | Fukumoto | |
| 2002/0175994 A1* | 11/2002 | Sakakibara | G06T 7/80 |
| | | | 348/146 |
| 2004/0202364 A1 | 10/2004 | Otani | |
| 2012/0077163 A1* | 3/2012 | Sucar Succar | A63B 23/16 |
| | | | 434/247 |
| 2012/0259204 A1* | 10/2012 | Carrat | A61B 34/20 |
| | | | 600/414 |
| 2014/0009582 A1* | 1/2014 | Suzuki | G01B 11/002 |
| | | | 348/46 |
| 2015/0345937 A1 | 12/2015 | Seitz et al. | |
| 2018/0031369 A1 | 2/2018 | Seitz et al. | |
| 2018/0345493 A1* | 12/2018 | Kokubo | B25J 9/1697 |

FOREIGN PATENT DOCUMENTS

| | | |
|---|---|---|
| DE | 102006021063 B3 | 9/2007 |
| JP | H04203907 A | 7/1992 |
| JP | 2003042726 A | 2/2003 |
| JP | 2008164493 A | 7/2008 |
| JP | 4423811 B2 | 3/2010 |
| JP | 4956960 B2 | 6/2012 |
| JP | 2015001465 A | 1/2015 |

OTHER PUBLICATIONS

Extended European Search Report issued in European Appln. No. 19939259.8 mailed Dec. 14, 2022.

International Search Report issued in International Application No. PCT/JP2019/029529 mailed on Sep. 3, 2019. English translation provided.

Written Opinion issued in International Application No. PCT/JP2019/029529 mailed on Sep. 3, 2019. English translation provided.

* cited by examiner

CALIBRATION METHOD FOR COMPUTER VISION SYSTEM AND THREE-DIMENSIONAL REFERENCE OBJECT FOR USE IN SAME

FIELD

The present invention relates to a calibration method for a computer vision system and a three-dimensional (3D) reference object for use with the calibration method.

BACKGROUND

A technique for improving alignment accuracy of 3D measurement data that is obtained through 3D measurement of a target object placed in a measurement space uses 3D measurement data obtained through 3D measurement of a 3D object (hereafter also a 3D reference object) placed in the measurement space.

For example, Patent Literature 1 describes a technique to determine wear of a tire tread over use by accurately aligning the circumferential positions of a tire tread and the positions of the tire in the width direction for 3D measurement data about the tire before and after use.

The technique uses a 3D reference object including three spheres. The 3D reference object is installed and fixed in a measurement space with rods extending from a fixed support that holds a tire in a rotatable manner. A coordinate transformation is determined for the coordinates of the centers of the spheres to move to predetermined target coordinates and is used to align 3D measurement data for the tire as a target object.

Such a 3D reference object can be recognized with sufficiently high accuracy using at least a predetermined number of measurement points. A 3D reference object with large spheres is to be used. However, a large 3D reference object may hide a target object or may use a large proportion of area and thus cause a relatively small imaging size, thus disabling measurement of the target object.

Another 3D reference object includes multiple planes (refer to, for example, Patent Literature 2) at undefined positions in tangent planes, thus possibly disabling accurate recognition of the position and orientation of a measurement viewpoint.

CITATION LIST

Patent Literature

Patent Literature 1: Japanese Patent No. 4956960
Patent Literature 2: Japanese Patent No. 4423811

SUMMARY

Technical Problem

In response to the above issue, one or more aspects of the present invention are directed to a 3D reference object that allows more accurate recognition of its position and orientation in 3D measurement, and a technique using the 3D reference object for more accurate calibration of 3D measurement in a computer vision system.

Solution to Problem

A calibration method according to an aspect of the present invention is a method for performing calibration in a computer vision system using a three-dimensional reference object. The system includes a three-dimensional measurement unit that performs three-dimensional measurement and a measurement controller that controls the three-dimensional measurement unit. The three-dimensional reference object is asymmetric as viewed in any direction and has predetermined dimensions to be a reference for recognition of a position and an orientation in the three-dimensional measurement. The method includes measuring the three-dimensional reference object by three-dimensional measurement with the three-dimensional measurement unit, calculating, based on data about a three-dimensional shape of the three-dimensional reference object and three-dimensional measurement data obtained through three-dimensional measurement of the three-dimensional reference object, a position and an orientation of the three-dimensional reference object relative to a measurement unit coordinate system defined for the three-dimensional measurement unit, and calculating, based on the position and the orientation of the three-dimensional reference object relative to the measurement unit coordinate system, a reference-measurement unit transformation matrix representing a coordinate transformation between a reference coordinate system defined for the three-dimensional reference object and the measurement unit coordinate system.

In this manner, the 3D reference object shaped asymmetric as viewed in any direction and with predetermined dimensions is used as a reference for recognizing its position and orientation in the 3D measurement. This allows accurate calculation of the position and the orientation of the 3D reference object relative to the measurement unit coordinate system defined for the 3D measurement unit. More accurate calculation of the position and the orientation of the 3D reference object relative to the measurement unit coordinate system allows accurate calculation of the reference-measurement unit transformation matrix representing a coordinate transformation between the reference coordinate system and the measurement unit coordinate system. This allows accurate calibration for a computer vision system including a 3D measurement unit.

In the above aspect of the present invention, the computer vision system may further include a robot including an arm, and a robot controller that controls the robot. The measuring the three-dimensional reference object by three-dimensional measurement with the three-dimensional measurement unit may include measuring the three-dimensional reference object by three-dimensional measurement by controlling the arm holding the three-dimensional reference object to change a position and an orientation of the three-dimensional reference object relative to the three-dimensional measurement unit.

In the computer vision system used for a robot with an arm, the arm holds the 3D reference object. This allows calculation of the position and the orientation of the 3D reference object relative to the measurement unit coordinate system based on multiple sets of 3D measurement data for different positions and orientations of the 3D reference object relative to the 3D measurement unit. This allows more accurate calculation of the position and the orientation of the 3D reference object relative to the measurement unit coordinate system. This allows accurate calibration of 3D measurement in the computer vision system.

In the above aspect of the present invention, the computer vision system may further include a robot including an arm, and a robot controller that controls the robot. The measuring the three-dimensional reference object by three-dimensional measurement with the three-dimensional measurement unit may include measuring the three-dimensional reference object by three-dimensional measurement by controlling the arm holding the three-dimensional measurement unit to change a position and an orientation of the three-dimensional measurement unit relative to the three-dimensional reference object.

In the computer vision system used for a robot with an arm, the arm holds the 3D measurement unit. This allows calculation of the position and the orientation of the 3D reference object relative to the measurement unit coordinate system based on multiple sets of 3D measurement data for different positions and orientations of the 3D reference object relative to the 3D measurement unit. This allows still more accurate calculation of the position and the orientation of the 3D reference object relative to the measurement unit coordinate system. This allows accurate calibration of 3D measurement in the computer vision system.

The calibration method according to the above aspect of the present invention may further include calculating, based on the reference-measurement unit transformation matrix, a robot-tool transformation matrix representing a coordinate transformation between a robot coordinate system defined for a basal end of the robot and a tool coordinate system defined for the arm, a tool-reference transformation matrix representing a coordinate transformation between the tool coordinate system and the reference coordinate system, and a robot-measurement unit transformation matrix representing a coordinate transformation between the robot coordinate system and the measurement unit coordinate system.

This allows more accurate calculation of the position and the orientation of the 3D reference object relative to the measurement unit coordinate system. This allows accurate calculation of the reference-measurement unit transformation matrix representing a coordinate transformation between the reference coordinate system and the measurement unit coordinate system. The robot-measurement unit transformation matrix representing a coordinate transformation between the robot coordinate system and the measurement unit coordinate system equals the product of the robot-tool transformation matrix, the tool-reference transformation matrix, and the reference-measurement unit transformation matrix. The unknown robot-measurement unit transformation matrix can be calculated based on the above relational expression, the reference-measurement unit transformation matrix already calculated, and known information about, for example, a sensor detection value indicating the position and the orientation of the arm of the robot. This allows accurate calibration between the robot and the 3D measurement unit.

In the above aspect of the present invention, the computer vision system may include a table on which the three-dimensional reference object is placeable to allow at least one of a position or an orientation of the three-dimensional reference object to be changed relative to the three-dimensional measurement unit. The measuring the three-dimensional reference object by three-dimensional measurement with the three-dimensional measurement unit may include measuring the three-dimensional reference object by three-dimensional measurement by changing at least one of a position or an orientation of the three-dimensional reference object relative to the three-dimensional measurement unit with the table.

The table is controlled to change at least the position or the orientation of the 3D reference object relative to the 3D measurement unit. This allows calculation of the position and the orientation of the 3D reference object relative to the measurement unit coordinate system based on multiple sets of 3D measurement data for different positions and orientations of the 3D reference object relative to the 3D measurement unit. This allows more accurate calculation of the position and the orientation of the 3D reference object relative to the measurement unit coordinate system. This allows accurate calibration of 3D measurement in the computer vision system.

In the above aspect of the present invention, the three-dimensional reference object may have a shape combining three cylinders each having two hemispherical ends in an axial direction with one end of each cylinder overlapping one end of the other cylinders.

The 3D reference object includes many curved surfaces with large curvatures, thus allowing more accurate calculation of the position and the orientation of the 3D reference object relative to the measurement unit coordinate system based on 3D measurement data from the 3D measurement unit. Each transformation matrix calculated as above is thus more accurate. In other words, this structure further allows more accurate calibration of 3D measurement in the computer vision system.

A three-dimensional reference object according to another aspect of the present invention is an object for use with the calibration method.

The 3D reference object allows accurate recognition of its position and orientation in 3D measurement. This allows more accurate calibration of 3D measurement in the computer vision system.

Advantageous Effects

The 3D reference object according to the above aspects of the present invention allows more accurate recognition of its position and orientation in 3D measurement, and the technique according to the above aspects of the present invention allows, using the 3D reference object, more accurate calibration of 3D measurement in a computer vision system.

DETAILED DESCRIPTION

Example Use

Example uses of the present invention will now be described with reference to the drawings.

Figure 1A:
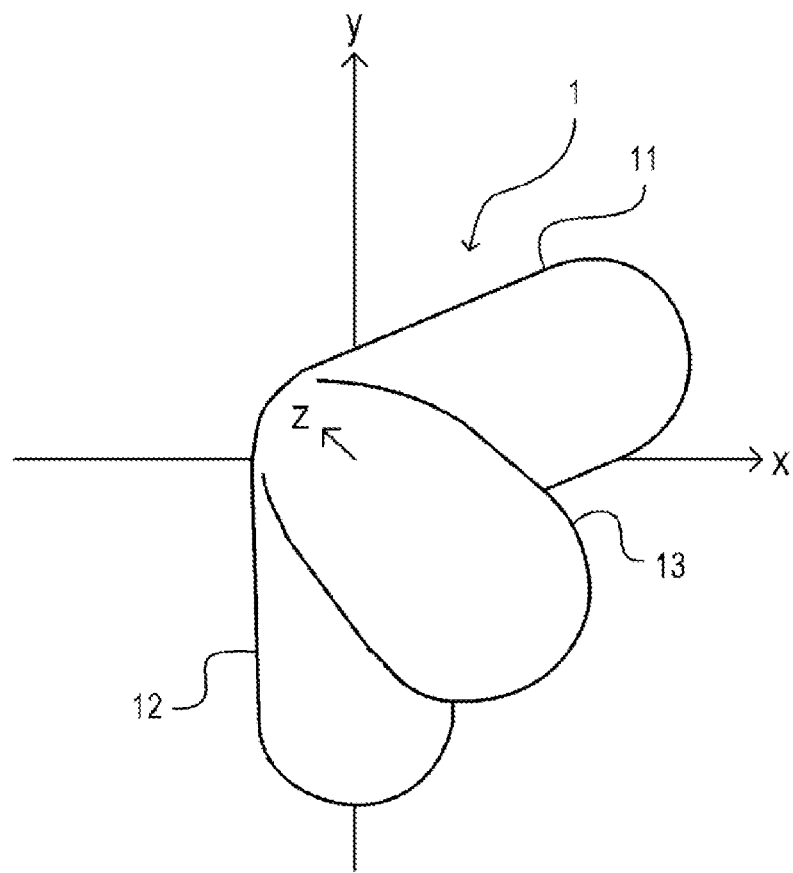
FIG. 1A is an overall perspective view of a 3D reference object.

FIG. 1A is a view of a three-dimensional (3D) reference object 1 according to an embodiment of the present invention. The 3D reference object 1 is shaped asymmetric as viewed in any direction and uniquely determines the orientation of the 3D reference object 1.

The 3D reference object 1 with known dimensions is prepared and measured by 3D measurement to obtain 3D measurement data. The 3D measurement data is processed to allow a 3D measurement unit such as a 3D sensor to accurately recognize the position and the orientation of the 3D reference object 1.

Figure 2:
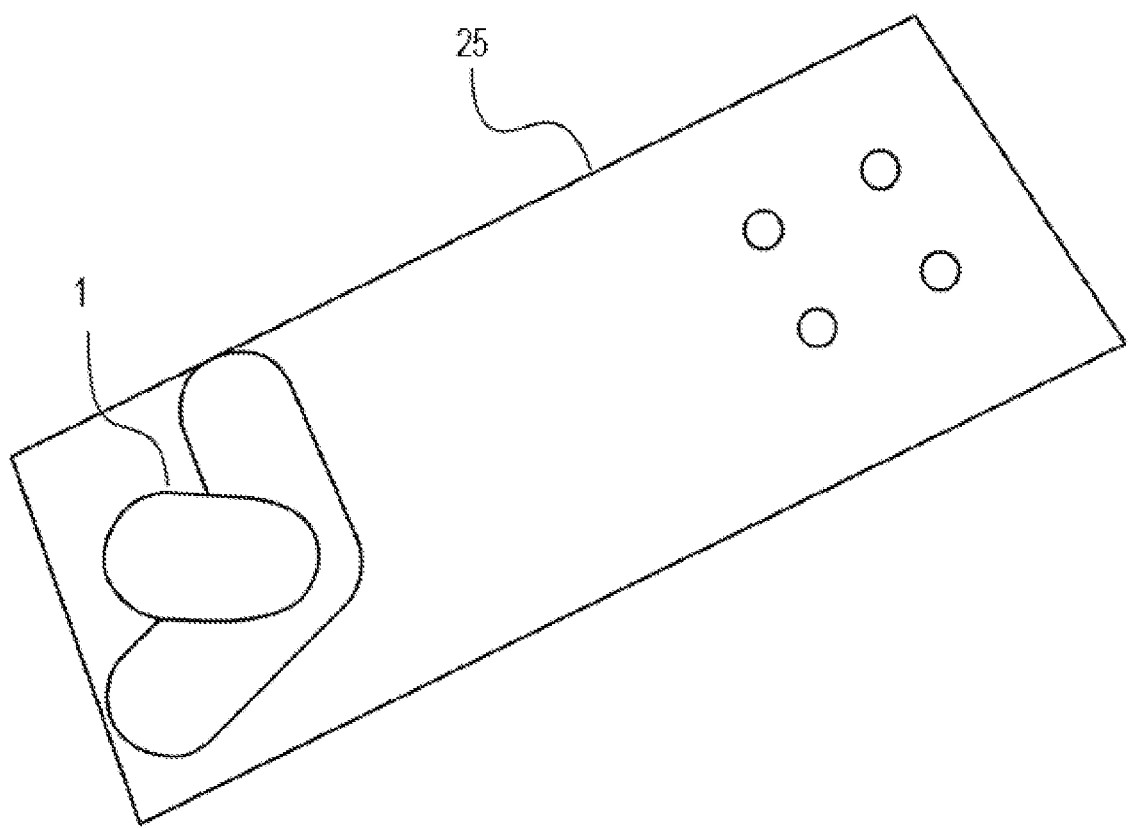
FIG. 2 is a view of the 3D reference object placed on a calibration board.
Figure 8:
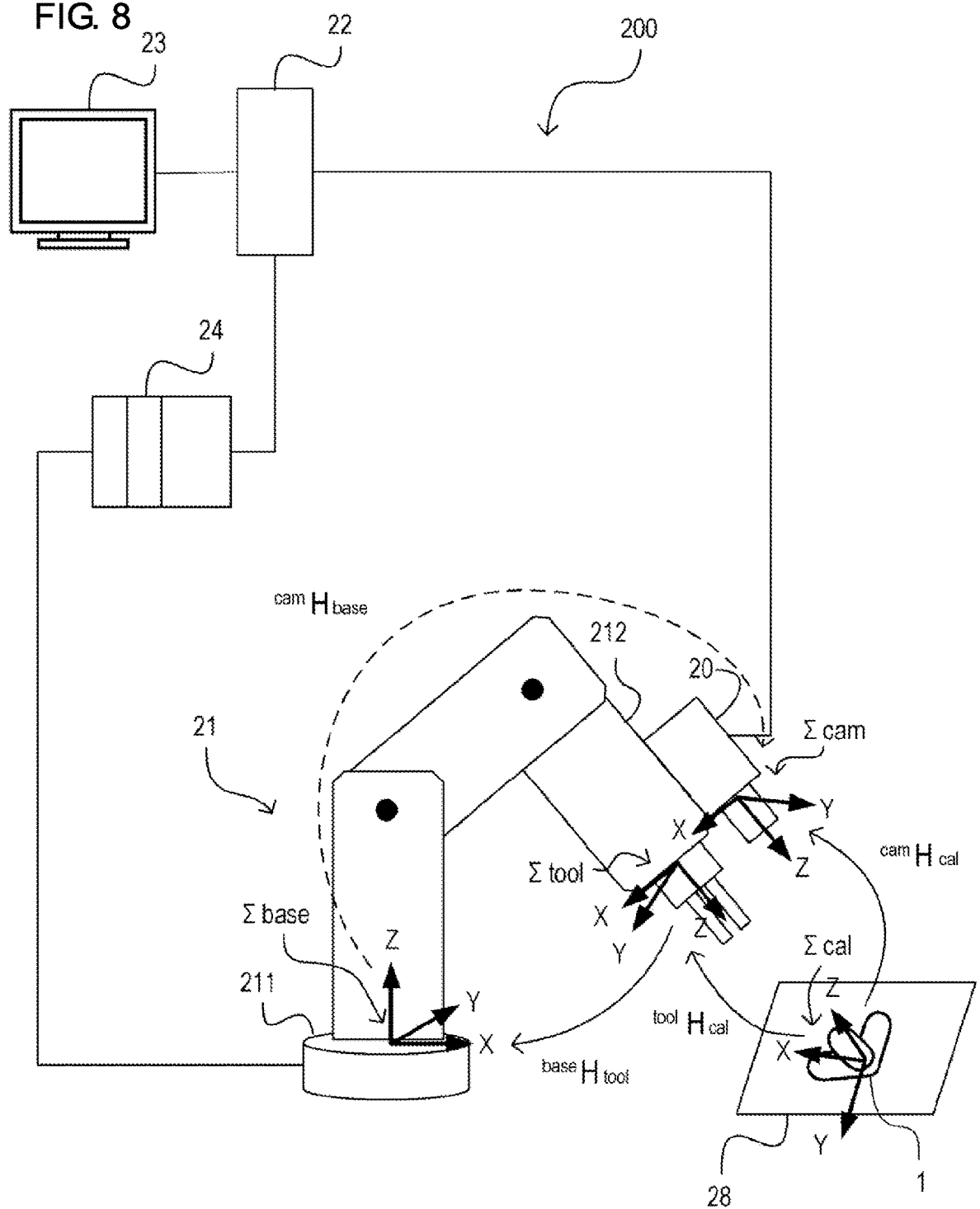
FIG. 8 is a schematic diagram of another robot vision system.

The 3D reference object 1 for such 3D measurement may be used in the manner described below. For example, a calibration board 25 on which the 3D reference object 1 is placed as shown in FIG. 2 is attached to a hand of a robot arm 212. The 3D reference object 1 is measured by 3D measurement with a sensor unit 20 that can perform 3D measurement to allow accurate recognition of the position and the orientation of the 3D reference object 1. This allows accurate calculation of an unknown transformation matrix for a transformation between the robot and the sensor. In other embodiments, as shown in FIG. 8, the sensor unit 20 attached to the hand of the robot arm 212 may measure the 3D reference object 1 on a table 28 placed in a workspace by 3D measurement. Similarly, this structure allows accurate recognition of the position and the orientation of the 3D reference object 1. This allows accurate calculation of an unknown transformation matrix for a transformation between the robot and the sensor.

Figure 3:
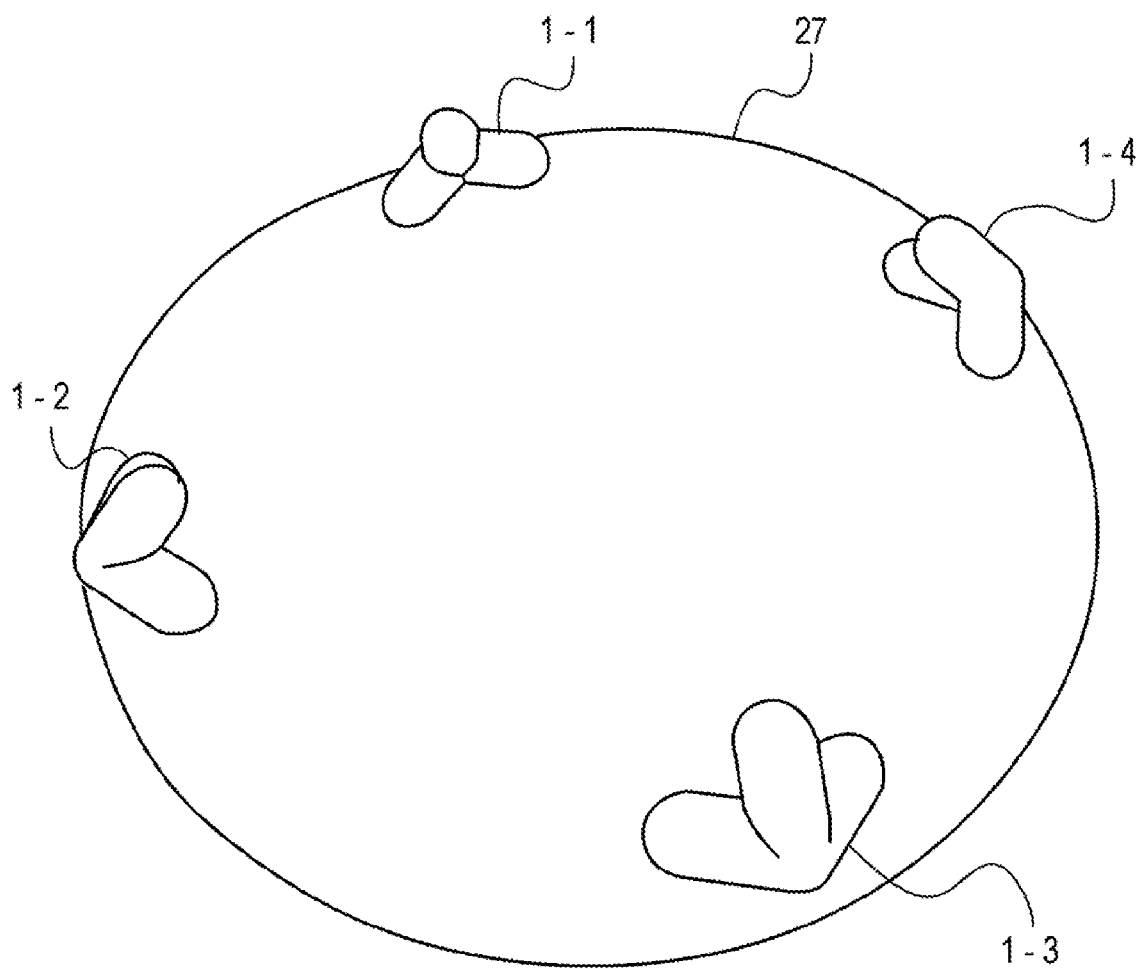
FIG. 3 is a view of the 3D reference objects placed on a turntable.

In other embodiments, as shown in FIG. 3, four 3D reference objects 1-1, 1-2, 1-3, and 1-4 are placed on a turntable 27 circumferentially about the center at intervals of 90 degrees. A target object is then placed at the center of the turntable 27 on which the 3D reference objects 1-1 to 1-4 are placed, and is measured by 3D measurement with a sensor. The recognition results of the positions and the orientations of the 3D reference objects 1-1 to 1-4 based on the 3D measurement data obtained in this manner are used to restore the 3D shape of the target object. The 3D reference objects 1-1 to 1-4 are arranged as above relative to the turntable 27 to prevent the 3D reference objects 1-1 to 1-4 from being hidden by the target object. An average from the recognition results of the positions and the orientations of the four 3D reference objects 1-1 to 1-4 is used for more accurate recognition. The turntable 27 is rotated with its center as the rotation center to change the positions and the orientations of the 3D reference objects 1-1, 1-2, 1-3, and 1-4 relative to the sensor. Four 3D reference objects as at least one 3D reference object 1 are placed on the turntable 27. However, the number and arrangement of the 3D reference objects are not limited to this example. The turntable 27 herein corresponds to a table in an aspect of the present invention.

In some embodiments, as shown in FIGS. 9A to 9E, for a target object 30 to be measured by 3D measurement from various relative positions, four 3D reference objects 1-5 to 1-8 may be placed at the four corners of a table 29 on which the target object 30 is placed. This allows accurate recognition of the position and the orientation of the target object 30. This allows accurate alignment between multiple sets of data about 3D measurement from various relative positions.

First Embodiment

3D Reference Object

Figure 1B:
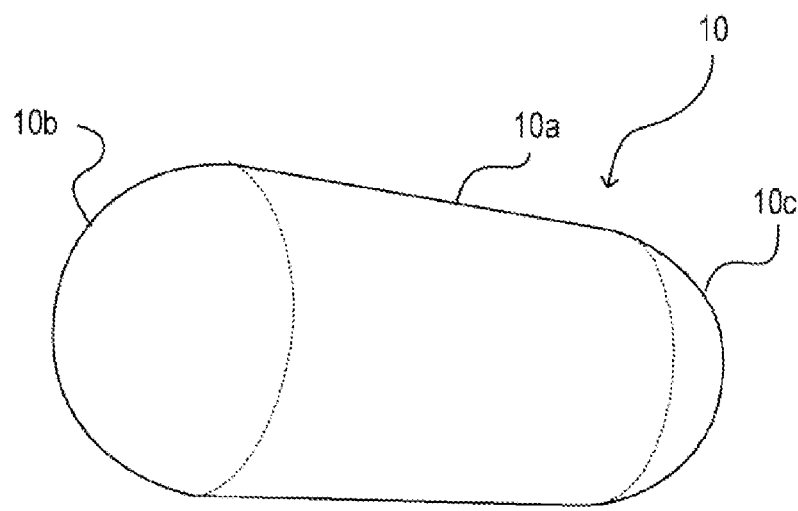
FIG. 1B is a perspective view of a component of the 3D reference object.

FIG. 1A shows the shape of a 3D reference object 1 according to the present embodiment. The 3D reference object 1 includes many curved surfaces with large curvatures, is shaped asymmetric as viewed in any direction, and uniquely determines the orientation of the 3D reference object 1. More specifically, the 3D reference object 1 is shaped by combining three objects 10 (refer to FIG. 1B) each having one end overlapping one end of the other objects 10. The object 10 includes a cylinder 10a with a radius of 12 mm and a length of 30 mm and hemispherical surfaces 10b and 10c with a radius of 12 mm located at either end of the cylinder 10a. In FIG. 1A, x-axis and y-axis are parallel to the page of the figure, and z-axis extends in the direction from the page of the figure. The 3D reference object 1 includes a first branch 11, a second branch 12, and a third branch 13. The first branch 11 is tilted at an angle of 23 degrees to the direction (y-direction) in which the second branch 12 extends. The third branch 13 is tilted at an angle of 40 degrees to z-axis. The second branch 12 is tilted at an angle of 7 degrees about x-axis. The dimensions and angles described above are mere examples and are not limited to these. The dimensions and angles of the branches may be changed as appropriate in accordance with the size of the measurement field of view of the 3D sensor.

The 3D reference object 1 may be processed to have diffuse reflecting surfaces to facilitate 3D measurement. Such diffuse reflecting surfaces may be achieved by selecting a material or providing surface treatment such as coating and roughing.

The 3D reference object 1 with a patterned surface may obstruct 3D measurement involving emission of patterned light. The 3D reference object 1 may thus have an unpatterned surface.

For 3D measurement using emission of visible light, the 3D reference object 1 may have a white surface.

Figure 4:
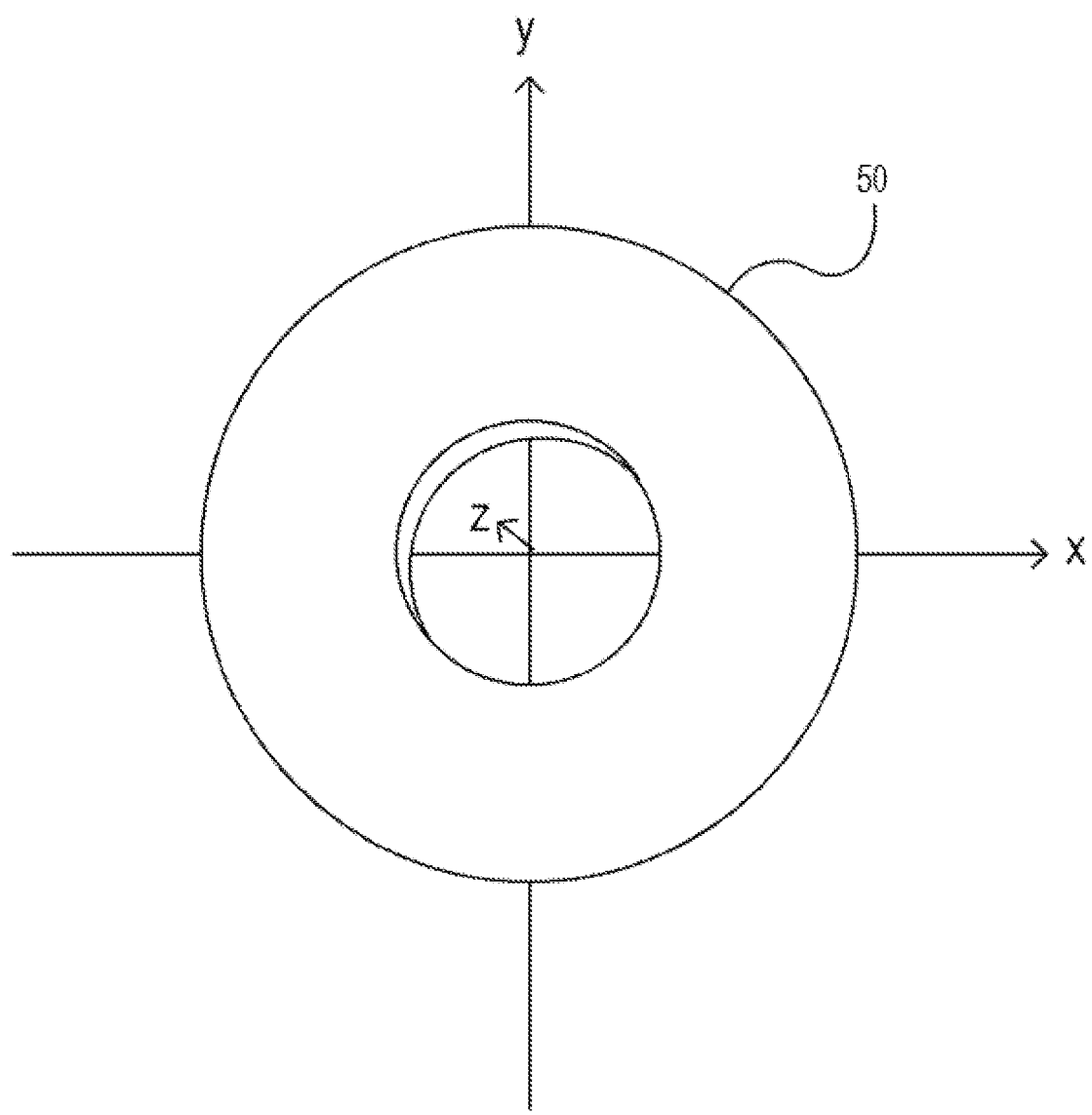
FIG. 4 is a view of a 3D object for comparison.

As described above, the 3D reference object 1 is shaped to uniquely determine the orientation of the 3D reference object 1 relative to any viewpoint. The 3D reference object 1 also has known dimensions. This allows accurate recognition of the position and the orientation of the 3D reference object 1 based on 3D measurement data obtained through 3D measurement of the 3D reference object 1. FIG. 4 is a view of a 3D reference object 50 for comparison. The 3D reference object 50 is a disk having a hollow at its center as a through-hole in the height direction. The 3D reference object 50 and the 3D reference object 1 remaining still are measured by 3D measurement 15 times in a row with a sensor. The table below shows standard deviations of the recognized positions and orientations in each direction. The x-translation denotes a translation in x-direction, and the x-rotation denotes a rotation about x-axis (the same applies to the other directions and angles).

TABLE 1

|  | x-translation (mm) | y-translation (mm) | z-translation (mm) | x-rotation (degree) | y-rotation (degree) |
|---|---|---|---|---|---|
| 3D reference object 1 | 0.058 | 0.039 | 0.033 | 0.091 | 0.049 |
| 3D reference object 50 | 0.146 | 0.212 | 0.011 | 0.058 | 0.059 |

As shown in the above table, the recognition results of the position and the orientation of the 3D reference object 50 vary greatly depending on the direction, whereas the position and the orientation of the 3D reference object 1 can be accurately recognized in any direction.

Overall Configuration of Robot Vision System

A robot vision system 100 in the embodiment of the present invention will be described with reference to FIG. 5.

The robot vision system 100 is installed on a production line for, for example, product assembly or processing. The robot vision system 100 recognizes, based on data received from the sensor unit 20, the gripping position and orientation of a multi-finger hand or a suction pad gripping an object placed in, for example, a tray. The multi-finger hand or the suction pad is attached to a distal end of an arm of a robot 21. The robot vision system 100 herein corresponds to a computer vision system in an aspect of the present invention.

Figure 5:
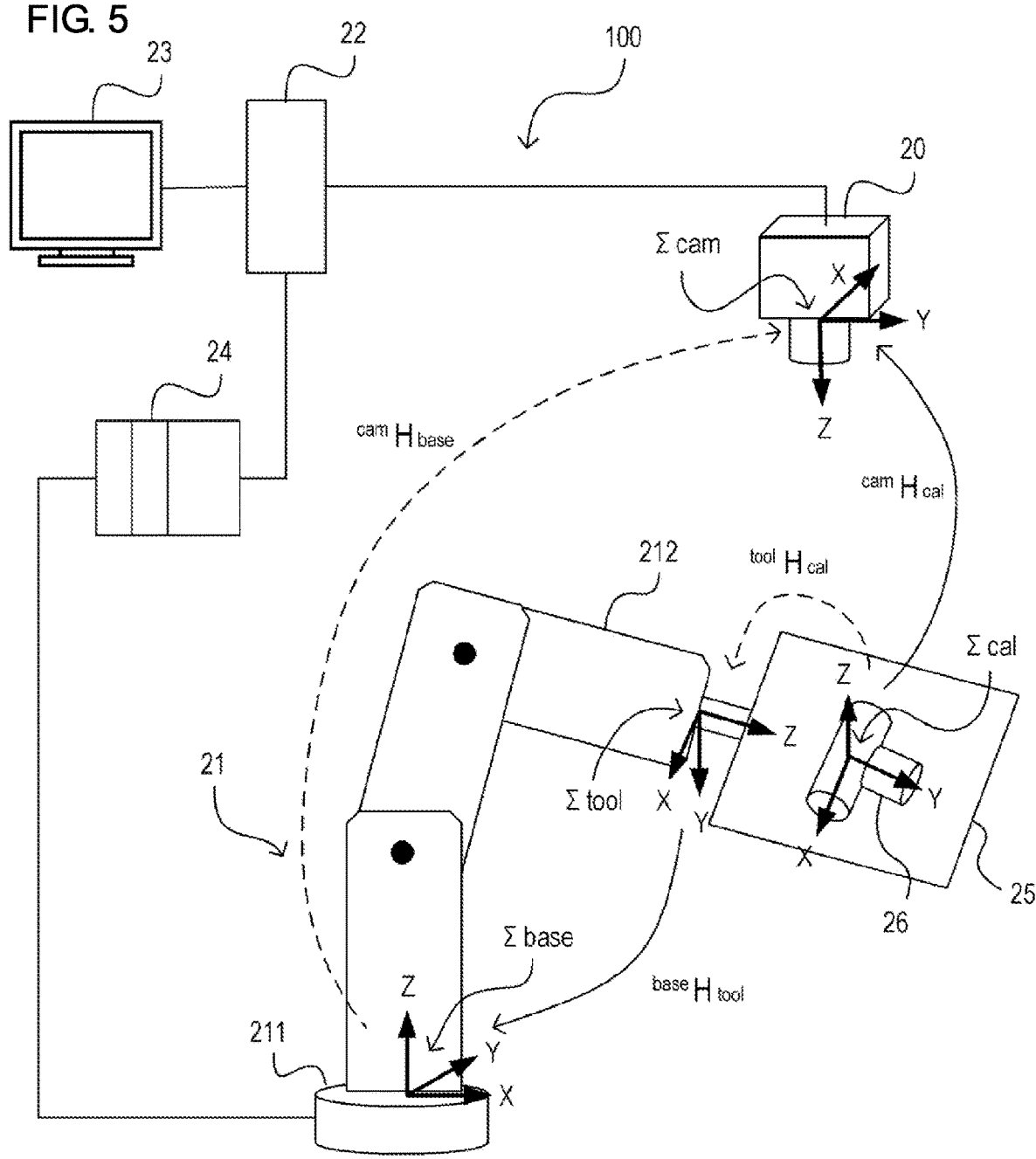
FIG. 5 is a schematic diagram of a robot vision system.

FIG. 5 shows the robot vision system 100 with the hand of an arm 212 receiving the calibration board 25 holding a calibration target 26 for robot-sensor unit calibration to be performed.

The robot vision system 100 mainly includes the sensor unit 20, an information processor 22, a programmable logic controller (PLC) 24, and the robot 21. The sensor unit 20 and the information processor 22 are connected to each other with wires or wirelessly. The information processor 22 receives the output from the sensor unit 20. The information processor 22 performs various processes using data received from the sensor unit 20. Examples of the processes performed by the information processor 22 may include distance measurement (ranging), 3D shape recognition, object recognition, and scene recognition. The process result from the information processor 22 is output to, for example, the PLC 24 or a display 23, and used for controlling the robot 21.

Sensor Unit

The sensor unit 20 includes at least a camera for capturing optical images of target objects. The sensor unit 20 may include any component (e.g., a sensor, an illuminator, or a projector) to be used for 3D measurement of target objects. For measuring the depth using stereo matching (also referred to as stereo vision or a stereo camera system), for example, the sensor unit 20 includes multiple cameras. For active stereo that projects a random dot pattern onto a target object, the sensor unit 20 further includes a projector for projecting structured light onto the target objects. For 3D measurement using pattern projection with space encoding, the sensor unit 20 includes a projector for projecting patterned light and cameras. Any other method may be used to generate 3D information about the target objects, such as photometric stereo, a time-of-flight (TOF) method, or phase shifting. The sensor unit 20 herein is fixed at a predetermined position. The sensor unit 20 herein corresponds to a 3D measurement unit in an aspect of the present invention.

Information Processor

The information processor 22 is, for example, a computer including a central processing unit (CPU), a random-access memory (RAM), a nonvolatile storage (e.g., a hard disk drive, or a solid-state drive or SSD), an input device, and an output device. In this case, the CPU loads the program stored in the nonvolatile storage into the RAM and executes the program to implement various components described later. The information processor 22 may have any other configuration. The components may be entirely or partly implemented by a dedicated circuit such as a field-programmable gate array (FPGA) or an application-specific integrated circuit (ASIC), or by cloud computing or distributed computing.

The robot 21 includes the arm 212 connected to a robot base 211 with multiple joints in between and having predetermined degrees of freedom. As described above, for gripping a target object, the arm 212 receives a multi-finger hand with multiple fingers or a suction pad at the distal end. The robot base 211 is installed on a floor surface or a predetermined installation part. In this embodiment, the calibration board 25 holding the calibration target 26 is attached to the hand of the arm 212. The robot base 211 herein corresponds to a basal end of a robot in an aspect of the present invention.

In this embodiment, the 3D reference object 1 having the shape shown in FIG. 1A and with known dimensions is used as the calibration target 26.

Figure 6:
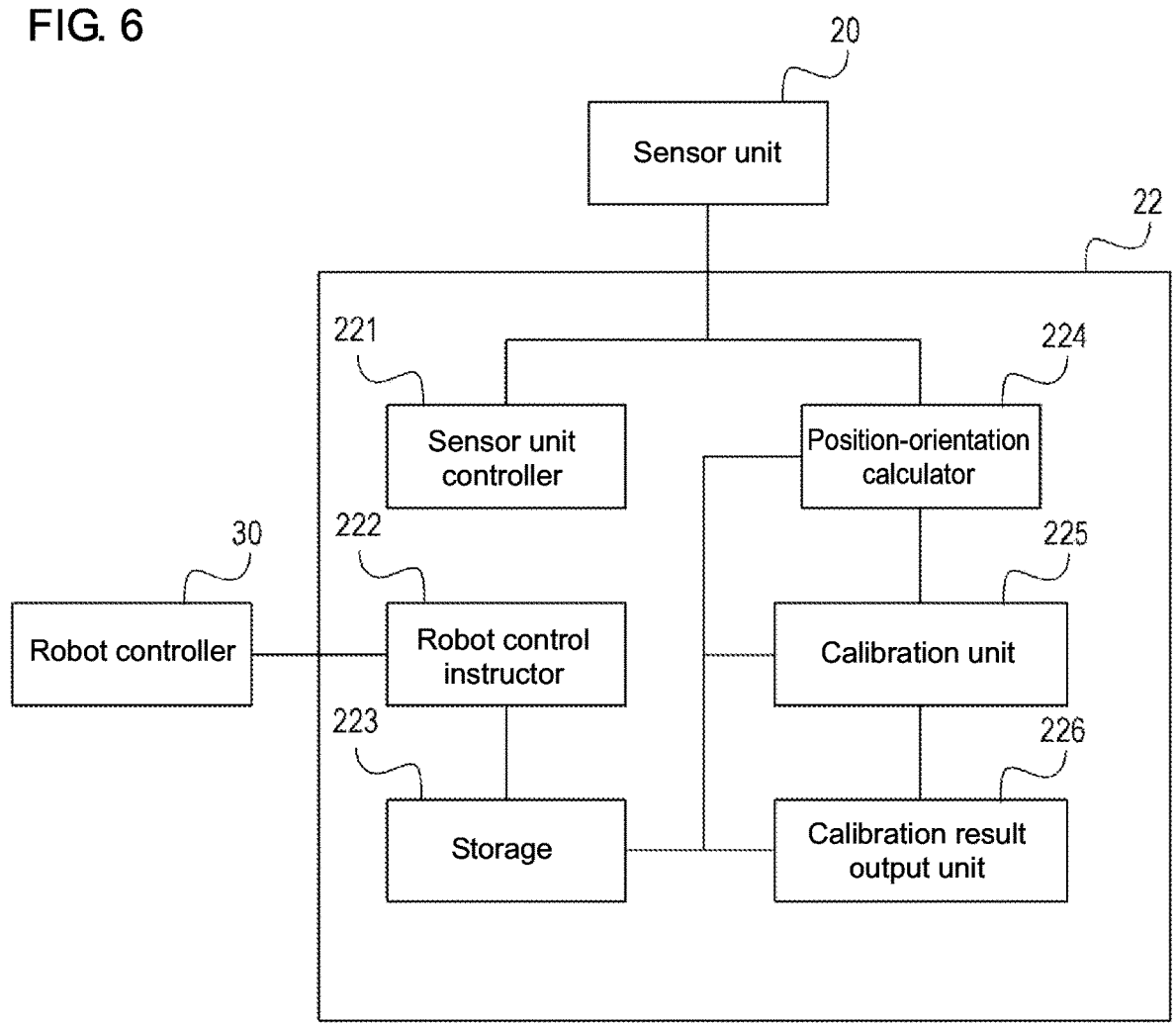
FIG. 6 is a functional block diagram of an information processor.

FIG. 6 is a functional block diagram showing the components of the information processor 22.

The information processor 22 includes a sensor unit controller 221, a robot control instructor 222, a storage 223, a position-orientation calculator 224, a calibration unit 225, and a calibration result output unit 226.

The sensor unit controller 221 controls the sensor unit 20 to instruct the sensor unit 20 to, for example, perform 3D measurement and output a 3D measurement result.

The robot control instructor 222 outputs a control instruction to a robot controller 30 including the PLC 24 and other components, and obtains a detection value of, for example, the rotation angle of a joint in the arm 212 of the robot 21 detected by a sensor and stores the detection value into a predetermined area in the storage 223. During calibration, the robot control instructor 222 outputs control information to the robot controller 30 to move the arm 212 and thus change the position of the 3D reference object 1 relative to the sensor unit 20.

The storage 223 includes a predetermined area in the nonvolatile storage device, and stores a detection value of, for example, the rotation angle of a joint in the arm 212 of the robot 21 detected by a sensor (described above), and data including dimension data about, for example, links between the robot base 211 and the distal end of the arm 212 and 3D shape data about the 3D reference object 1 (described later).

The position-orientation calculator 224 calculates the position and the orientation of the 3D reference object 1 based on 3D measurement data obtained through 3D measurement of the 3D reference object 1 by the sensor unit 20 and the 3D shape data about the 3D reference object 1.

The calibration unit 225 performs a calibration process (described later).

The calibration result output unit 226 outputs a result of calibration to an external device, or stores the result into a predetermined area in the storage 223. A calibration result is used for, for example, recognition of a target object gripping position performed by a robot vision system.

Calibration Process

With reference to the flowchart in FIG. 7, an example calibration process implementing a calibration method will now be described.

Robot-sensor unit calibration calculates a transformation matrix representing a coordinate transformation between a coordinate system defined for the robot 21 and a coordinate system defined for the sensor unit 20.

A camera coordinate system defined for the camera in the sensor unit 20 shown in FIG. 5 is denoted by $\Sigma \text{cam}$, a target coordinate system defined for the calibration target 26 is denoted by $\Sigma \text{cal}$, a tool coordinate system defined for the distal end of the arm 212 is denoted by $\Sigma \text{tool}$, and a robot coordinate system defined for the robot base 211 is denoted by $\Sigma \text{base}$. A transformation matrix for a transformation from the target coordinate system $\Sigma \text{cal}$ to the camera coordinate system $\Sigma \text{cam}$ is written as $^{cam}H_{cal}$. A transformation matrix for a transformation from the target coordinate system $\Sigma \text{cal}$ to the tool coordinate system $\Sigma \text{tool}$ is written as $^{tool}H_{cal}$. A transformation matrix for a transformation from the tool coordinate system $\Sigma \text{tool}$ to the robot coordinate system $\Sigma \text{base}$ is written as $^{base}H_{tool}$. A transformation matrix for a transformation from the robot coordinate system $\Sigma \text{base}$ to the camera coordinate system Σcam is written as $^{cam}H_{base}$. The relations among these transformation matrices are written by Formula 1 below.

$$^{cam}H_{cal} = {}^{cam}H_{base} \cdot {}^{base}H_{tool} \cdot {}^{tool}H_{cal} \quad (1)$$

The camera coordinate system Σcam herein corresponds to a measurement unit coordinate system in an aspect of the present invention, the target coordinate system Σcal corresponds to a reference coordinate system in an aspect of the present invention, and the transformation matrix $^{cam}H_{cal}$ corresponds to a reference-measurement unit transformation matrix in an aspect of the present invention. The transformation matrix $^{base}H_{tool}$ corresponds to a robot-tool transformation matrix in an aspect of the present invention, the transformation matrix $^{tool}H_{cal}$ corresponds to a tool-reference transformation matrix in an aspect of the present invention, and the transformation matrix $^{cam}H_{base}$ corresponds to a robot-measurement unit transformation matrix in an aspect of the present invention.

As shown in FIG. 5, the sensor unit 20 measures the calibration target 26 placed on the calibration board 25 attached to the hand of the arm 212 of the robot 21 by 3D measurement (step S1).

A 3D shape model such as 3D computer-aided design (CAD) data about the calibration target 26 is fitted with 3D measurement data obtained through the 3D measurement of the calibration target 26 by the sensor unit 20. The position and the orientation of the calibration target 26 in the camera coordinate system Σcam can thus be calculated (step S2). The 3D measurement data is obtained through 3D measurement and includes multiple points each having 3D information. The 3D measurement data may, as with point cloud data, include multiple points each having a 3D coordinate value in the camera coordinate system, or may include multiple points (pixels) in a two-dimensional image each associated with a depth value (depth information). In this embodiment, point cloud data is used as the 3D measurement data.

The position and the orientation of the calibration target 26 in the camera coordinate system Σcam is recognized to identify the positional relationship between the target coordinate system Σcal defined for the calibration target 26 and the camera coordinate system Σcam. The transformation matrix $^{cam}H_{cal}$ for a transformation from the target coordinate system Σcal to the camera coordinate system Σcam can thus be calculated (step S3).

The position and angle of the hand of the arm 212 relative to the robot base 211 can be calculated from dimension data about links and other components between the robot base 211 and the hand of the arm 212 and detection values from a sensor that detects the amount of displacement in each degree of freedom including the rotation angle of each joint. Thus, the transformation matrix $^{base}H_{tool}$ for a transformation from the tool coordinate system Σtool to the robot coordinate system Σbase can be calculated (step S4).

The attaching position and orientation of the calibration board 25 relative to the hand of the arm 212 are preset. The position and the orientation of the calibration target 26 to be placed relative to the calibration board 25 are preset. The position of the calibration target 26 relative to the hand of the arm 212 is thus known. Thus, the transformation matrix $^{tool}H_{cal}$ for a transformation from the target coordinate system Σcal to the tool coordinate system Σtool can also be calculated (step S4).

The relations among the transformation matrix $^{tool}H_{cal}$ for a transformation from the target coordinate system Σcal to the tool coordinate system Σtool, the transformation matrix $^{base}H_{tool}$ for a transformation from the tool coordinate system Σtool to the robot coordinate system Σbase, the transformation matrix $^{cam}H_{cal}$ for a transformation from the target coordinate system Σcal to the camera coordinate system Σcam, and the transformation matrix $^{cam}H_{base}$ for a transformation from the robot coordinate system Σbase to the camera coordinate system Σcam are written by Formula 1.

As described above, the position and the orientation of the calibration target 26 are recognized to calculate the transformation matrix $^{cam}H_{cal}$ for a transformation from the target coordinate system Σcal to the camera coordinate system Σcam. The attaching position and orientation of the calibration board 25 relative to the hand of the arm 212 are preset. The position and the orientation of the calibration target 26 to be placed relative to the calibration board 25 are preset. Thus, the position of the calibration target 26 relative to the hand of the arm 212 is known. Thus, the transformation matrix $^{tool}H_{cal}$ for a transformation from the target coordinate system Σcal to the tool coordinate system Σtool can also be calculated. The position of the hand of the arm 212 relative to the robot base 211 can be calculated from dimension data about the links between the robot base 211 and the hand of the arm 212 and detection values from a sensor that detects a rotational angle of each joint. Thus, the transformation matrix $^{base}H_{tool}$ for a transformation from the tool coordinate system Σtool to the robot coordinate system Σbase can also be calculated.

The transformation matrices in Formula 1 except $^{cam}H_{base}$ on the right side can thus be calculated. Thus, $^{cam}H_{base}$ can be calculated with Formula 1. In other words, a transformation matrix for a transformation from the robot coordinate system Σbase to the camera coordinate system Σcam can be calculated, thus allowing robot-sensor unit calibration (step S5).

The calibration result is output to an external device or stored into a predetermined area in the storage 223 (step S6).

In the above process, the position and the orientation of the calibration target 26 relative to the tool coordinate system Σtool are known, and the transformation matrix $^{tool}H_{cal}$ for a transformation from the target coordinate system Σcal to the tool coordinate system Σtool can be calculated. A process performed when the position and the orientation of the calibration target 26 relative to the tool coordinate system Σtool is unknow will now be described. In this case, the robot 21 is controlled to cause the calibration target 26 to have different positions and orientations relative to the sensor unit 20. The sensor unit 20 then measures the calibration target 26 in the multiple positions and orientations by 3D measurement. The calibration target 26 at different positions and orientations as above has a constant relative relationship with the tool coordinate system Σtool. Thus, the transformation matrix $^{tool}H_{cal}$ for a transformation from the target coordinate system Σcal to the tool coordinate system Σtool can be calculated with multiple Formulas 1 for the calibration target 26 at the different positions and orientations.

Second Embodiment

Overall Configuration of Robot Vision System

A robot vision system 200 in a second embodiment of the present invention will be described with reference to FIG. 8.

The same components as in the first embodiment are given the same numerals and will not be described in detail. The robot vision system 200 herein corresponds to a computer vision system in an aspect of the present invention.

In the robot vision system 200, the sensor unit 20 is attached to the hand of the arm 212 of the robot 21. Except for the attaching position of the sensor unit 20, the robot vision system 200 has the same configuration as the robot vision system 100.

In the robot vision system 200, the 3D reference object 1 is placed on the table 28 in a workspace in which the robot 21 is placed.

The camera coordinate system Σcam, the target coordinate system Σcal defined for the 3D reference object 1 as a calibration target, the tool coordinate system Σtool, and the robot coordinate system Σbase are the same as in the first embodiment. The transformation matrices between these coordinate systems, $^{cam}H_{cal}$, $^{tool}H_{cal}$, $^{base}H_{tool}$, and $^{cam}H_{base}$ are also the same as in the first embodiment.

Formula 1 also applies to the relations among these transformation matrices.

Figure 7:
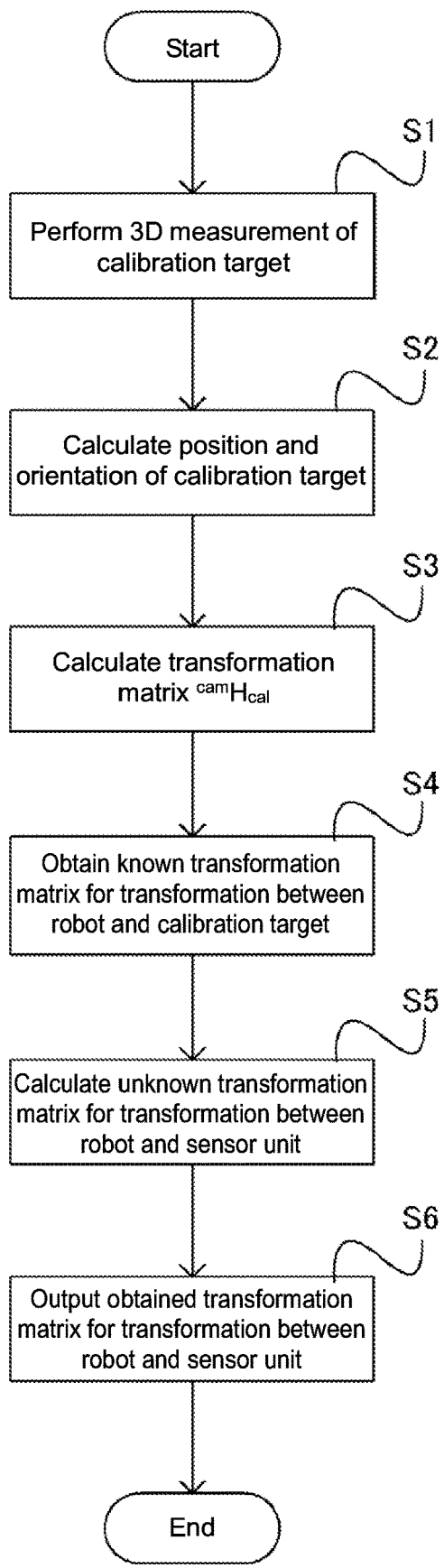
FIG. 7 is a flowchart showing a calibration procedure.

In this embodiment as well, robot-sensor unit calibration is performed with the same procedure shown in FIG. 7.

In the present embodiment, the sensor unit 20 is attached to the hand of the arm 212. Thus, the relative positional relationship between the camera coordinate system Σcam and the tool coordinate system Σtool remains the same independently of the operation of the robot. Instead of the transformation matrix for a transformation between the target coordinate system Σcal and the tool coordinate system Σtool, a transformation matrix $^{tool}H_{cam}$ for a transformation from the camera coordinate system to the tool coordinate system may be used for calibration.

In the example shown in FIG. 8, one 3D reference object 1 is placed on the table 28. Instead, as shown in FIG. 3, the turntable 27 on which multiple (four in this example) 3D reference objects 1-1, 1-2, 1-3, and 1-4 are placed as calibration targets may be placed in a workspace. The multiple 3D reference objects 1-1, 1-2, 1-3, and 1-4 allow more accurate calibration.

Third Embodiment

Alignment of 3D Measurement Data about Target Object Using 3D Reference Object

Other than the robot-sensor unit calibration described above, the 3D reference object 1 may be used in the manner described below.

FIGS. 9A to 9E show 3D measurement data obtained through 3D measurement of the substantially square table 29 from different viewpoints, with the target object 30 placed on the center of the table 29 and 3D reference objects 1-5, 1-6, 1-7, and 1-8 placed at the four corners.

Figure 9A:
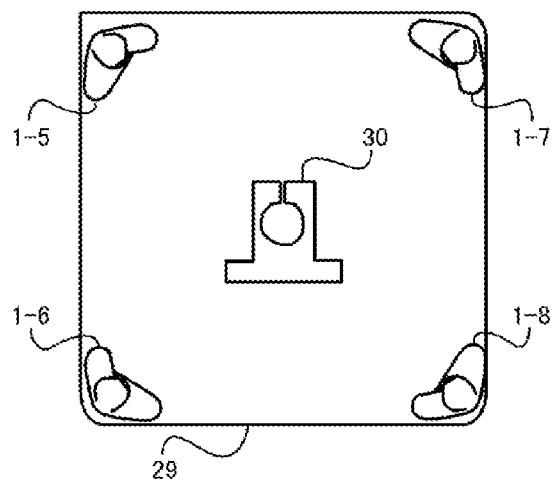
FIGS. 9A to 9E are diagrams showing 3D measurement data about the 3D reference objects and a target object placed on a table as viewed from different viewpoints.
Figure 9B:
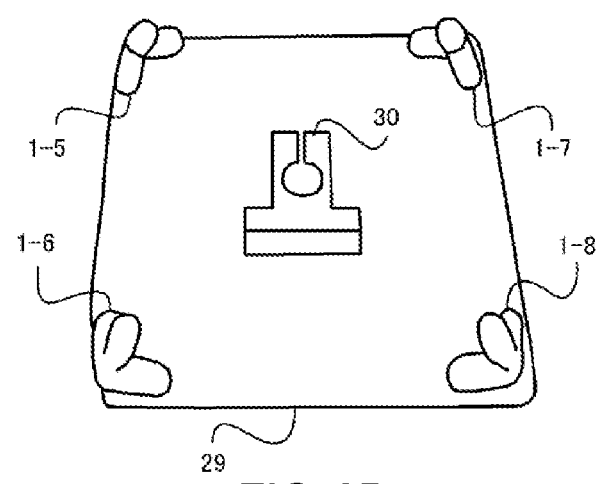
Figure 9C:
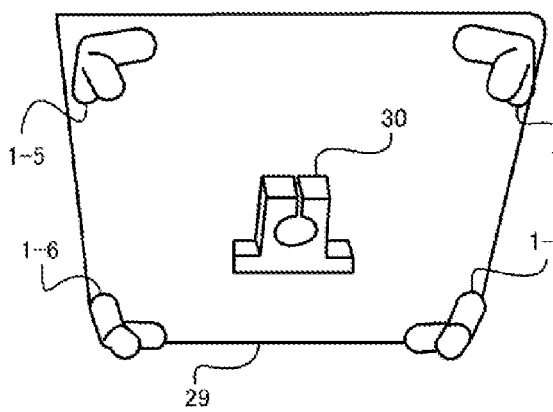
Figure 9D:
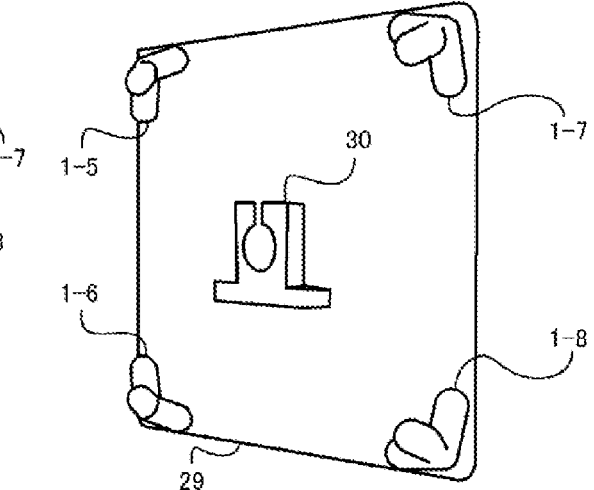
Figure 9E:
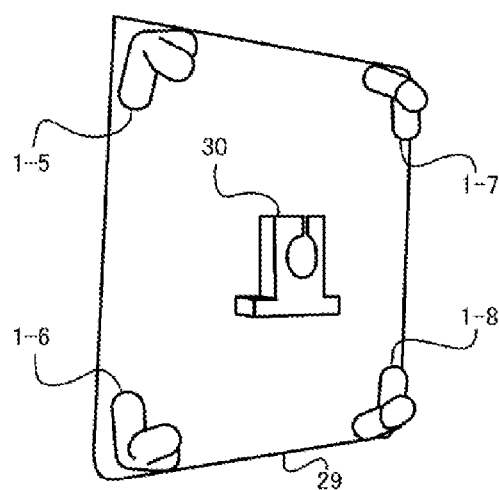

Three-dimensional measurement of the target object 30 from one viewpoint fails to provide 3D measurement data about all the surfaces of the target object 30, which has a 3D shape. Three-dimensional measurement data about portions of the target object 30 shadowed when viewed from the camera viewpoint cannot be obtained. As shown in FIG. 9A, 3D measurement with the camera facing the table 29 provides 3D measurement data about a front surface of the target object 30 (with a front surface facing toward the front of the page of FIG. 9A, and upper, lower, right side, and left side surfaces of the target object 30 being defined based on FIG. 9A) without providing 3D data about the upper, lower, right side, and left side surfaces of the target object 30.

FIGS. 9B to 9E respectively show 3D measurement data obtained through 3D measurement with the camera from viewpoints facing the lower surface, upper surface, right side surface, and left side surface of the target object 30. As shown in FIGS. 9A to 9E, the relative position of the target object 30 relative to the viewpoint of the camera is changed to obtain 3D measurement data about various portions of the target object 30.

Three-dimensional measurement data obtained in this manner through 3D measurement of the target object 30 from different viewpoints allows more accurate restoration of the 3D shape of the target object 30. When the 3D shape of the target object 30 is restored by integrating 3D measurement data obtained through 3D measurement from different viewpoints, accurate alignment between the multiple sets of the 3D measurement data is to be performed. Thus, the position and the orientation of the target object 30 in the 3D measurement of the target object 30 are to be accurately recognized.

The 3D reference objects 1-5, 1-6, 1-7, and 1-8 according to the present embodiment are each shaped asymmetric as viewed in any direction and uniquely determine their orientation, and have known dimensions. The positions and the orientations of the 3D reference objects 1-5, 1-6, 1-7, and 1-8 used in 3D measurement can thus be recognized accurately. The 3D reference objects 1-5, 1-6, 1-7, and 1-8 placed on the table 29 on which the target object 30 is placed allow accurate recognition of the position and the orientation of the target object 30 in 3D measurement. The 3D reference objects 1-5, 1-6, 1-7, and 1-8 placed at the four corners of the table 29 are prevented from being hidden. The recognition results of the positions and the orientations of the four 3D reference objects 1-5, 1-6, 1-7, and 1-8 are averaged to allow more accurate recognition of the position and the orientation of the target object 30. The number of 3D reference objects 1 and the positions of the 3D reference objects 1 relative to the target object 30 are not limited to those in the embodiment and may be set as appropriate in accordance with, for example, the shape of the target object 30 and the field of view of the camera.

When no 3D CAD data of the target object 30 is provided, or 3D CAD data about the target object 30 differs greatly from the actual target object 30, 3D CAD data cannot be used or may be inappropriate for an operation such as picking in which a multi-finger hand or a suction pad attached to the distal end of the arm of the robot 21 grips the target object 30. In this case, the target object 30 is measured by 3D measurement to generate 3D model data about the target object 30 from the 3D measurement data. The 3D model data about the target object 30 generated in this manner is used to recognize the gripping position of the target object 30 in an operation such as picking. Based on the recognition result, the robot is controlled to perform picking or another operation. In this case, 3D measurement of the target object 30 may be performed with, instead of the calibration board 25, the table 29 on which the 3D reference objects 1-5, 1-6, 1-7, and 1-8 are placed attached to the hand of the arm 212 of the robot 21 in FIG. 5. The robot 21 is controlled to change the position and the orientation of the target object 30 relative to the sensor unit 20 to perform 3D measurement. In some embodiments, the table 29 on which the target object 30 and the 3D reference objects 1-5, 1-6, 1-7, and 1-8 are placed may be placed in a workspace for the robot 21, and the position and the orientation of the sensor unit 20 attached to the hand of the arm 212 of the robot 21 shown in FIG. 8 may be changed to perform 3D measurement.

When 3D measurement is performed by changing the positions and the orientations of the sensor unit 20 and the target object 30, the position and orientation of either the sensor unit 20 or the target object 30 may be changed. The sensor unit 20 may be fixed and the position and the orientation of the target object 30 may be changed.

Advantages of Present Embodiment

In the configurations and the processes described above, 3D measurement is performed using the 3D reference object 1 shaped asymmetric as viewed in any direction and having predetermined dimensions. This allows accurate recognition of the position and the orientation of the 3D reference object 1 relative to the sensor unit. The technique according to the embodiments thus allows more accurate robot-sensor unit calibration.

The elements in the aspects of the present invention below are identified with reference numerals used in the drawings to show the correspondence between these elements and the components in the embodiments.

Aspect 1

A calibration method for performing calibration in a computer vision system using a three-dimensional reference object (1), the system including a three-dimensional measurement unit (20) configured to perform three-dimensional measurement and a measurement controller (221) configured to control the three-dimensional measurement unit (20), the three-dimensional reference object (1) being asymmetric as viewed in any direction and having predetermined dimensions to be a reference for recognition of a position and an orientation in the three-dimensional measurement, the method comprising:
  (S1) measuring the three-dimensional reference object (1) by three-dimensional measurement with the three-dimensional measurement unit (20);
  (S2) calculating, based on data about a three-dimensional shape of the three-dimensional reference object (1) and three-dimensional measurement data obtained through three-dimensional measurement of the three-dimensional reference object (1), a position and an orientation of the three-dimensional reference object relative to a measurement unit coordinate system defined for the three-dimensional measurement unit (20); and
  (S3) calculating, based on the position and the orientation of the three-dimensional reference object (1) relative to the measurement unit coordinate system, a reference-measurement unit transformation matrix representing a coordinate transformation between a reference coordinate system defined for the three-dimensional reference object (1) and the measurement unit coordinate system.

REFERENCE SIGNS LIST

1 3D reference object
20 sensor unit
21 robot
27 turntable
30 robot controller
211 basal end
212 arm
221 sensor unit controller
100, 200 robot vision system

The invention claimed is:

1. A calibration method for performing calibration in a computer vision system using a three-dimensional reference object, the system including a three-dimensional measurement unit configured to perform three-dimensional measurement and a measurement controller configured to control the three-dimensional measurement unit, the three-dimensional reference object having a shape combining three cylinders each having two hemispherical ends with the same radii as a radius of the cylinder in an axial direction with one end of each cylinder overlapping one end of the other cylinders, being asymmetric as viewed in any direction, and having predetermined dimensions to be a reference for recognition of a position and an orientation in the three-dimensional measurement, the method comprising:
  measuring the three-dimensional reference object having the shape combining the three cylinders each having two hemispherical ends with the same radii as a radius of the cylinder in the axial direction with one end of each cylinder overlapping one end of the other cylinders by three-dimensional measurement with the three-dimensional measurement unit;
  calculating, based on data about a three-dimensional shape of the three-dimensional reference object and three-dimensional measurement data obtained through three-dimensional measurement of the three-dimensional reference object, a position and an orientation of the three-dimensional reference object relative to a measurement unit coordinate system defined for the three-dimensional measurement unit; and
  calculating, based on the position and the orientation of the three-dimensional reference object relative to the measurement unit coordinate system, a reference-measurement unit transformation matrix representing a coordinate transformation between a reference coordinate system defined for the three-dimensional reference object and the measurement unit coordinate system.

2. The calibration method according to claim 1, wherein the computer vision system further includes
a robot including an arm, and
a robot controller configured to control the robot, and
the measuring the three-dimensional reference object by three-dimensional measurement with the three-dimensional measurement unit includes measuring the three-dimensional reference object by three-dimensional measurement by controlling the arm holding the three-dimensional reference object to change a position and an orientation of the three-dimensional reference object relative to the three-dimensional measurement unit.

3. The calibration method according to claim 1, wherein the computer vision system further includes
a robot including an arm, and
a robot controller configured to control the robot, and
the measuring the three-dimensional reference object by three-dimensional measurement with the three-dimensional measurement unit includes measuring the three-dimensional reference object by three-dimensional measurement by controlling the arm holding the three-dimensional measurement unit to change a position and an orientation of the three-dimensional measurement unit relative to the three-dimensional reference object.

4. The calibration method according to claim 2, further comprising:
  calculating, based on the reference-measurement unit transformation matrix, a robot-tool transformation matrix representing a coordinate transformation between a robot coordinate system defined for a basal end of the robot and a tool coordinate system defined for the arm, a tool-reference transformation matrix representing a coordinate transformation between the tool coordinate system and the reference coordinate system, and a robot-measurement unit transformation matrix representing a coordinate transformation between the robot coordinate system and the measurement unit coordinate system.

5. The calibration method according to claim 1, wherein
the computer vision system includes a table on which the three-dimensional reference object is placeable to allow at least one of a position or an orientation of the three-dimensional reference object to be changed relative to the three-dimensional measurement unit, and
the measuring the three-dimensional reference object by three-dimensional measurement with the three-dimensional measurement unit includes measuring the three-dimensional reference object by three-dimensional measurement by changing at least one of a position or an orientation of the three-dimensional reference object relative to the three-dimensional measurement unit with the table.

6. A three-dimensional reference object for use with the calibration method according to claim 1.

* * * * *